(12) United States Patent
Kuroyanagi

(10) Patent No.: US 6,813,141 B2
(45) Date of Patent: Nov. 2, 2004

(54) SOLID ELECTROLYTIC CAPACITOR AND METHOD FOR PRODUCING THE SAME

(75) Inventor: Masahiro Kuroyanagi, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/376,232

(22) Filed: Mar. 3, 2003

(65) Prior Publication Data

US 2003/0165046 A1 Sep. 4, 2003

Related U.S. Application Data

(60) Provisional application No. 60/362,092, filed on Mar. 7, 2002.

(30) Foreign Application Priority Data

Mar. 4, 2002 (JP) ..................................... P2002-057004

(51) Int. Cl.[7] ........................... H01G 4/228; H01G 9/10
(52) U.S. Cl. ...................... 361/533; 361/538; 29/25.03
(58) Field of Search ................................ 361/523–540; 29/25.03

(56) References Cited

U.S. PATENT DOCUMENTS 6,219,223 B1 * 4/2001 Kobayashi et al. ......... 361/525

6,616,713 B2 * 9/2003 Sano et al. ................. 29/25.03

FOREIGN PATENT DOCUMENTS

| EP | 634761 A1 * | 1/1995 | ............ H01G/9/00 |
| JP | 2-15611 | 1/1990 | |
| JP | 08-186061 | 7/1996 | |
| JP | 10-32145 | 2/1998 | |

* cited by examiner

*Primary Examiner*—Dean A. Reichard
*Assistant Examiner*—Eric Thomas
(74) *Attorney, Agent, or Firm*—Sughrue Mion, PLLC

(57) ABSTRACT

A solid electrolytic capacitor having a solid electrolytic capacitor element having an anode part assigned to one end part of an anode substrate composed of a valve-acting metal having on the surface thereof a dielectric film layer, and a cathode part including of a solid electrolyte layer formed on the dielectric film layer in the remaining portion of the anode substrate and having an electrically conducting layer formed thereon. The anode part is connected to a lead frame via a weld metal provided on the anode part of the solid electrolytic capacitor element by irradiating the anode part with a laser ray. Also disclosed is a method of producing the solid electrolytic capacitor.

30 Claims, 3 Drawing Sheets

-- Prior Art --

-- Prior Art --

-- Prior Art --

-- Prior Art --

SOLID ELECTROLYTIC CAPACITOR AND METHOD FOR PRODUCING THE SAME

CROSS-REFERENCE TO RELATED APPLICATIONS

This application claims benefit of Provisional Application 60/362,092 filed Mar. 7, 2002, incorporated herein by reference, under 35 U.S.C. §111(b) pursuant to 35 U.S.C. §119(e) (1).

BACKGROUND OF THE INVENTION

1. Field of the Invention

The present invention relates to a solid electrolytic capacitor and a method for producing the same. More specifically, the present invention relates to a solid electrolytic capacitor obtained by stacking valve-acting metal substrates each having a dielectric film, where a welded metal is provided in the anode part of the capacitor element. The present invention also relates to a production method therefor.

2. Description of the Related Art

With recent progress of small-size and high-frequency electronic instruments, there is a demand for a small size solid electrolytic capacitor as one of electronic parts used therefor. The response to this requirement for downsizing is generally met by a chip-form multilayer capacitor.

FIG. 1 is a perspective view showing a conventional chip-form solid electrolytic capacitor. A plurality of solid electrolytic capacitor elements 1 are disposed to lie in the same direction inside an outer jacket resin 6. The anode part 3 of the capacitor element 1 and the bottom surface of the cathode part 2 formed on the surface of the element are placed on an anode lead part 5 (as an anode lead drawing out part of a lead frame) and on a cathode lead part 4 (as a cathode lead drawing out part), respectively. Also, each is bonded to the part with an electrically conducting material such as electrically conducting adhesive. The anode lead part and the cathode lead part are paired and disposed to face each other. The thus-fabricated device is molded with a separately prepared outer jacket resin 6 such as epoxy resin.

For example, in the case where the capacitor element in a solid electrolytic capacitor has a tabular shape, a dielectric film is provided on the surface of an electrode material composed of a tabular metal having valve action, a solid electrolyte layer is provided on the dielectric film, an electrically conducting cathode layer is provided on the solid electrolyte layer to form a cathode part of the capacitor element, an anode part is integrally provided on the electrode material of the capacitor element, a resist film for masking is applied to provide a portion which becomes the anode lead part, a plurality of capacitor elements are stacked one on another such that the connection part of electrically conducting cathode layers and the connection part of anode parts come to respective corresponding positions, and the stacked body is connected to a cathode lead part and an anode lead part. By employing such a structure, the volume efficiency (capacitance value of capacitor with a fixed volume) of the capacitance of a capacitor is elevated.

In a solid electrolytic capacitor having a multilayer structure, welding which ensures stable strength is sometimes used for connecting the anode parts of a plurality of capacitor elements to the anode lead part. Known examples of the welding include resistance welding, arc welding, laser welding and ultrasonic welding.

In the case of laser welding, the anode part of the uppermost capacitor to the anode part of the lowermost capacitor element, as well as the anode lead part, must be uniformly melted. However, since the anode part (valve-acting metal) of the capacitor element usually has a melting point lower than that of the anode lead part, when a laser is irradiated to an extent sufficient to melt the anode lead part, the anode parts are melted too early. Therefore, the selection of the laser intensity and irradiation time is difficult and there is a problem that too large of a gap is produced between the anode parts or between the anode part and the anode lead part that readily causes connection failure.

Furthermore, the anode part of the capacitor element does not always show a constant laser light absorption factor. For example, in the case where the anode part is aluminum, the part irradiated with a laser hardly generates heat due to extremely low light absorption factor and despite the low melting point, the anode part is hardly melted due to high heat conductivity. Thus, the selection of laser intensity and irradiation time becomes more difficult. JP-A-8-186061 (the term "JP-A" as used herein means an "unexamined published Japanese patent application") discloses a technique where a reflection layer having a laser reflectance of 90% or more is provided on the anode lead wire and the anode part of the capacitor element and the anode lead are welded by irradiating with a laser. However, in the case of a multilayer capacitor, anode parts of capacitor elements must be connected and a problem to be solved is present in this point.

In the case where the anode part of the capacitor element is etched, the sponge-state etched part (porous part) recovers the original density of the anode part metal when melted by a laser ray. As a result, the volume of the welding part becomes smaller than the volume before welding to disadvantageously cause welding failure.

BRIEF SUMMARY OF THE INVENTION

The present inventors have made extensive studies to solve the above-described problems. As a result, the present invention provides a solid electrolytic capacitor and a production method therefor, where in using laser welding as means for connecting anode parts of capacitor elements and the anode lead part, a laser ray is irradiated after providing a weld metal on the anode part of the capacitor element, to thereby obtain a good connection between capacitor elements and between the capacitor element and the anode lead part.

More specifically, the present invention provides the following solid electrolytic capacitor and a method for producing the same:

1) a solid electrolytic capacitor comprising a molded body of a solid electrolytic capacitor element having an anode part assigned to one end part of an anode substrate composed of a valve-acting metal having on the surface thereof a dielectric film layer, and a cathode part including a solid electrolyte layer formed on the dielectric film layer in a remaining portion of the anode substrate and having an electrically conducting layer formed thereon, the anode part being connected to a lead frame via a weld metal provided on the anode part of the solid electrolytic capacitor element by irradiating the anode part with a laser ray, and said body being molded with an outer jacket resin;

2) a solid electrolytic capacitor comprising a molded body of a plurality of solid electrolytic capacitor elements each having an anode part assigned to one end part of an anode substrate composed of a valve-acting metal having on the surface thereof a dielectric film layer, and a cathode part consisting of a solid electrolyte layer formed on the dielectric film layer in the remaining portion of the anode substrate and an electrically conducting layer formed thereon, the anode parts and the cathode parts being stacked one on the other, the anode parts being connected to a lead frame via a weld metal provided on one or more of the anode part of the solid electrolytic capacitor elements by irradiating the anode parts with a laser ray, and the stacked body being molded with an outer jacket resin;

3) the solid electrolytic capacitor as described in 1 or 2 above, wherein the weld metal is interposed between the anode part of the capacitor element and the lead frame and/or between the anode parts of the solid electrolytic capacitor elements;

4) the solid electrolytic capacitor as described in any one of 1 to 3 above, wherein the weld metal is a metal capable of being melted by the laser ray;

5) the solid electrolytic capacitor as described in any one of 1 to 4 above, wherein the laser ray is a ray emitted from a YAG laser, $YVO_4$ laser, carbon dioxide laser or Ar laser;

6) the solid electrolytic capacitor as described in any one of 1 to 5 above, wherein the weld metal is selected from the group consisting of nickel, iron, copper, aluminum, chromium, molybdenum and alloys thereof;

7) the solid electrolytic capacitor as described in any one of 1 to 6 above, wherein the valve-acting metal is selected from the group consisting of aluminum, tantalum, titanium, niobium and alloys thereof;

8) the solid electrolytic capacitor as described in any one of 1 to 6 above, wherein the valve-acting metal is an electrochemically formed aluminum foil or electrochemically formed niobium foil;

9) the solid electrolytic capacitor as described in any one of 1 to 8 above, wherein the valve-acting metal is a foil electrochemically formed at a voltage of less than 30 V;

10) the solid electrolytic capacitor as described in any one of 1 to 9 above, wherein the lead frame is a copper- or copper alloy-based material;

11) the solid electrolytic capacitor as described in any one of 1 to 10 above, wherein the solid electrolyte comprises a π-electron conjugated system polymer;

12) the solid electrolytic capacitor as described in 11 above, wherein the π-electron conjugated system polymer is a polymer obtained from a 5-membered heterocyclic compound;

13) the solid electrolytic capacitor as described in 12 above, wherein the 5-membered heterocyclic compound comprises at least one compound selected from the group consisting of pyrrole, thiophene, furan, isothianaphthene, 1,3-dihydroisothianaphthene and substitution derivatives thereof;

14) the solid electrolytic capacitor as described in 12 above, wherein the 5-membered heterocyclic compound comprises at least one compound selected from the group consisting of 3,4-ethylenedioxythiophene and 1,3-dihydroisothianaphthene;

15) a method for producing a solid electrolytic capacitor, which comprises providing an anode part at one end part of an anode substrate composed of a valve-acting metal having on the surface thereof a dielectric film layer, forming a solid electrolyte layer on the dielectric film layer in a remaining portion of the anode substrate and an electrically conducting layer thereon to provide a cathode part, thereby preparing a solid electrolytic capacitor element, providing a weld metal on the anode part, irradiating the anode part with a laser ray to connect it to a lead frame, and molding with an outer jacket resin;

16) the method for producing a solid electrolytic capacitor as described in 15 above, which comprises stacking a plurality of the solid electrolytic capacitor elements to superpose the anode parts and the cathode parts one on the other, providing a weld metal on one or more of the anode parts, irradiating the anode parts with a laser ray to connect them to a lead frame, and molding the stacked body with an outer jacket resin; and 17) the method for producing a solid electrolytic capacitor as described in 15 or 16 above, wherein the laser ray is a ray emitted from a YAG laser, $YVO_4$ laser, carbon dioxide laser or Ar laser.

DETAILED DESCRIPTION OF THE INVENTION

Figure 1:
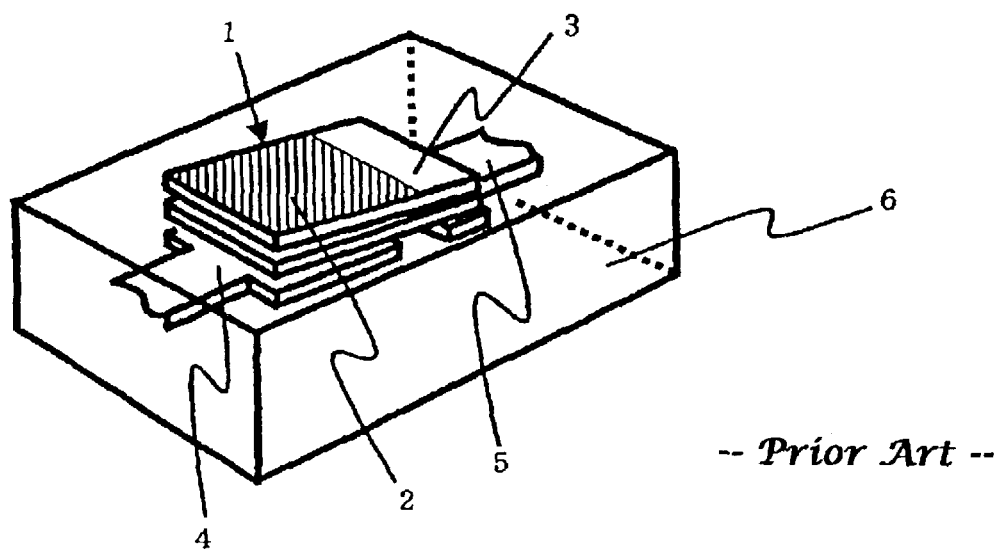
FIG. 1 is a perspective view showing a conventional multilayer solid electrolytic capacitor.

The present invention is described in detail below.

Valve-Acting Metal

For the valve-acting metal used as the anode substrate of the solid electrolytic capacitor in the present invention, for example, any of aluminum, tantalum, titanium, niobium, zirconium and alloys thereof can be used. Examples of the shape of the anode substrate include a tabular foil or plate and a bar. Among these, an electrochemically formed aluminum foil is practically used in many cases because it is inexpensive. The electrochemically formed aluminum foil use in the invention has a thickness of 40 to 200 μm and as a tabular element unit, has a rectangular shape with a length and a width of about 1 to about 30 mm. The electrochemically formed aluminum foil preferably has a width of 2 to 20 mm and a length of 2 to 20 mm, more preferably a width of 2 to 5 mm and a length of 2 to 6 mm. The voltage for the electrochemical forming may be either low or high but is preferably low, and an electrochemically formed foil obtained by electrochemical forming at a voltage of less than 30 V is preferred.

The dielectric film layer provided on the surface of the anode substrate may be an oxide layer of the valve-acting metal itself, which is produced on the surface portion of the valve-acting metal, or may be another dielectric layer provided on the surface of the valve-acting metal foil. However, the dielectric film layer is preferably a layer composed of an oxide of the valve-acting metal itself.

Solid Electrolyte

On the remaining portion of the dielectric film layer excluding the anode part, a solid electrolyte is formed. The kind of solid electrolyte layer is not particularly limited and a conventionally known solid electrolyte can be used.

Particularly, an electrically conducting polymer having a high electrical conductivity is preferred as the solid electrolyte, because the solid electrolytic capacitor manufactured using the polymer has a reduced equivalent series resistance component, has a large in the capacitance, is small in size and exhibits good high-frequency performance as compared with conventional wet electrolytic capacitors using an electrolytic solution or solid electrolytic capacitors using manganese dioxide.

The electrically conducting polymer for forming the solid electrolyte of the solid electrolytic capacitor of the present invention is not limited, but is preferably an electrically conducting polymer having a π-electron conjugated system structure. Examples thereof include electrically conducting polymers containing as a repeating unit a structure shown by a compound having a thiophene skeleton, a compound having a polycyclic sulfide skeleton, a compound having a pyrrole skeleton, a compound having a furan skeleton, or the like.

Among the monomers used as the raw material of the electrically conducting polymer, examples of the compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylthiophene, 3,4-methylenedioxythiopene and 3,4-ethylenedioxythiophene. In general, these compounds are commercially available or can be prepared by a known method (see, for example, *Synthetic Metals*, Vol. 15, page 169 (1986)).

Examples of the compound having a polycyclic sulfide skeleton which can be used include compounds having a 1,3-dihydro-polycyclic sulfide (also called 1,3-dihydrobenzo[c]thiophene) skeleton and compounds having a 1,3-dihydronaphtho[2,3-c]thiophene skeleton. Furthermore, compounds having a 1,3-dihydroanthra[2,3-c] thiophene skeleton and compounds having a 1,3-dihydronaphthaceno[2,3-c]thiophene skeleton may be used. These compounds can be prepared by a known method, for example, the method described in JP-A-8-3156.

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton and 1,3-dihydrobenzo[a]anthraceno[7,8-c]thiophene derivatives can be used.

Compounds optionally containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole, however, the present invention is not limited thereto. These compounds are commercially available or may be prepared by a known method.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds are commercially available or may be prepared by a known method.

The means for polymerization may be electrolytic polymerization, chemical oxidative polymerization or a combination thereof. Also, a method of first forming a solid electrolyte, which is not an electrically conducting polymer, on the dielectric film and then forming an electrically conducting polymer by the above-described polymerization method may be used.

The electrically conducting polymer may be formed, for example, by a method where a 3,4-ethylenedioxythiophene monomer and an oxidizing agent each preferably in the form of a solution are coated separately one after another or coated simultaneously on the dielectric film and then the polymer is formed (see, JP-A-2-15611 and JP-A-10-32145).

In general, a compound (dopant) having a doping ability is used in the electrically conducting polymer. The dopant may be added to either a monomer solution or an oxidizing agent solution. A compound which serves as the dopant and also as the oxidizing agent, such as a metal salt of organic sulfonic acid, may also be used. The dopant is preferably an arylsulfonate-based dopant. For example, salts of benzenesulfonic acid, toluenesulfonic acid, naphthalenesulfonic acid, anthracenesulfonic acid and anthraquinonesulfonic acid can be used.

Solid Electrolytic Capacitor

On the solid electrolyte layer comprising such an electrically conducting polymer, a conventionally known electrically conducting paste such as carbon paste and/or silver paste is stacked to form an electrically conducting layer, thereby constituting the cathode part (the part where the electrically conducting layer is formed). At the boundary of the anode part and the cathode part, an insulating resin layer may be circumferentially (like a headband) formed using an insulating resin layer (resist film for masking).

Figure 2:
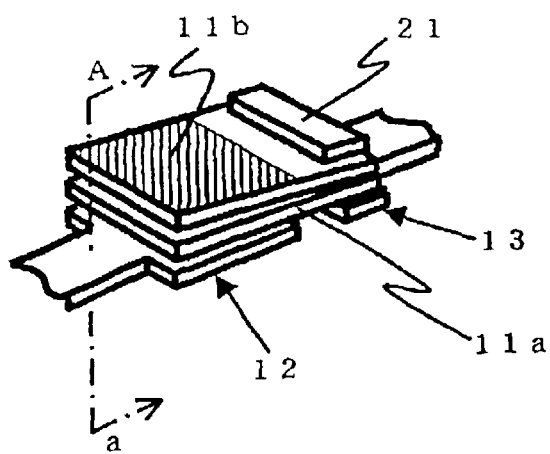
FIG. 2 is a perspective view of the capacitor element of the present invention.

The method for stacking a plurality of capacitor elements thus processed until the formation of the electrically conducting layer, while aligning the elements in the same direction, is described. As shown in FIG. 2, capacitor elements 11a and 11b are joined to a cathode lead part 12 using an electrically conducting adhesive or the like. The electrically conducting adhesive is coated on the cathode lead part side, on the capacitor element side or on both sides thereof.

A weld metal 21 is laid on the anode part of the capacitor element 11b and a laser ray is irradiated thereon from above (not shown). The weld metal should melt when irradiated with a laser ray, and is selected from the group consisting of Ni, Fe, Cu, Al, Cr, Mo, Sn, Zn and alloys thereof. For example, Ni, Fe, Ni—Cu alloy, Ni—Fe alloy, Ni—Fe—Cr alloy, Ni—Cr—Mo alloy and Cu—Ni alloy may be used. Among these, preferred are Ni, Fe, Ni alloy and Fe alloy, more preferred are Ni and Ni alloy.

The thickness of the weld metal varies depending on the thickness of the capacitor element but is generally from 10 to 1,000 $\mu$m. For example, when the thickness of the valve-acting metal of the capacitor element is from 100 to 200 $\mu$m, the thickness of the weld metal is suitably from about 50 to about 500 $\mu$m, preferably from about 100 to about 200 $\mu$m.

The site where the weld metal is provided is not limited to the anode part of the uppermost capacitor element as shown in FIG. 2, but may be provided between anode parts of the respective capacitor elements or between the anode part of the lowermost capacitor element and the anode lead part 13. The weld metal may also be provided in all portions between respective anode parts of the stacked capacitor elements, a portion of the anode part constituting an uppermost layer, and a portion between the anode part constituting a lowermost layer and the lead frame, however, the portion where the weld metal is provided is not particularly limited insofar as electrical and mechanical connection of the capacitor elements to the anode lead part can be substantially attained.

If desired, degreasing of the welding part, removal of contaminants and removal of the oxide film may be performed before welding. By performing these treatments, the hydrogen source such as oils and fats, water content and foreign matter as the main cause of generating blow holes is removed and also the oxide film which is a high melting substance is removed from the welding part. As a result, good laser welding can be performed.

As for the laser ray, a ray emitted from a YAG (yttrium.aluminum.garnet) laser, $YVO_4$ (yttrium.vanadium tetroxide) laser, Ar (argon) laser, $CO_2$ (carbon dioxide) laser and the like may be used. For example, the output waveform of a YAG laser can be controlled by setting the pulse current and is therefore suitably used.

The laser welding may be applied to one portion or a plurality of portions and this may suffice if electrical and mechanical connection of a plurality of capacitor elements to the lead frame can be substantially attained. In the case of laser welding at a plurality of portions, the irradiation point may be deflected from the first laser irradiation point to the second or later laser irradiation point at intervals of a predetermined time. At the same time, a preheating current may be output at each irradiation point immediately before output of the main welding current.

Figure 3A:
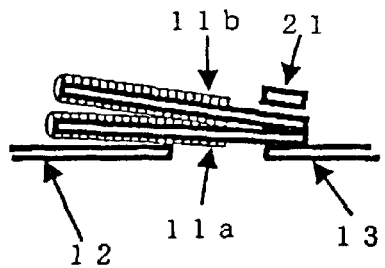
FIG. 3(a) is a cross-sectional view of the solid electrolytic capacitor of the present invention and FIG. 3(b) is a cross-sectional view of the anode part.
Figure 3B:
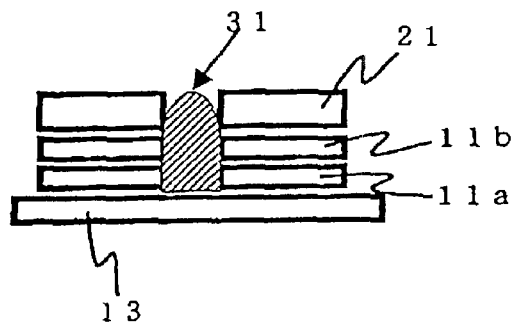

FIG. 3a shows a cross-sectional view at A-a of FIG. 2 of the present invention and FIG. 3b shows the cross section of the welding part in the anode part after irradiating with the laser. As shown in FIG. 3b, the melted weld metal 31 fills the gap between the anode lead part and the anode part of the capacitor element, the gap between the anode parts of the capacitor elements, and the gap in the etched part on the surface of the capacitor element, so that strong bonding can be obtained between respective members.

Figure 4:
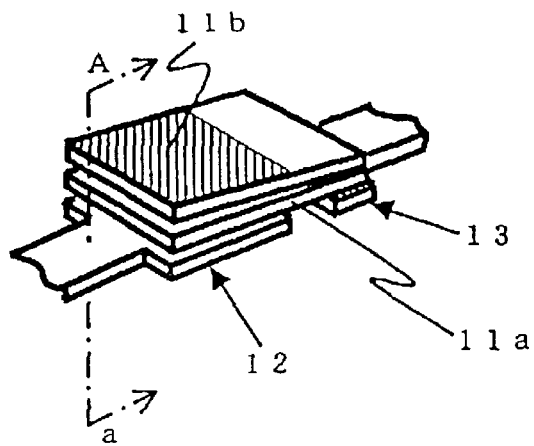
FIG. 4 is a perspective view showing a conventional capacitor element.
Figure 5A:
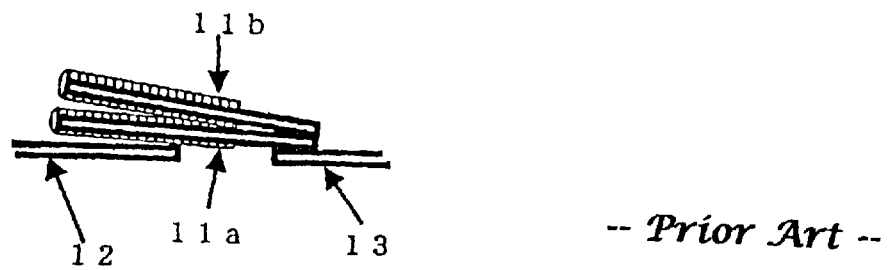
FIG. 5(a) is a cross-sectional view of a conventional solid electrolytic capacitor and FIG. 5(b) is a cross-sectional view of the anode part.
Figure 5B:
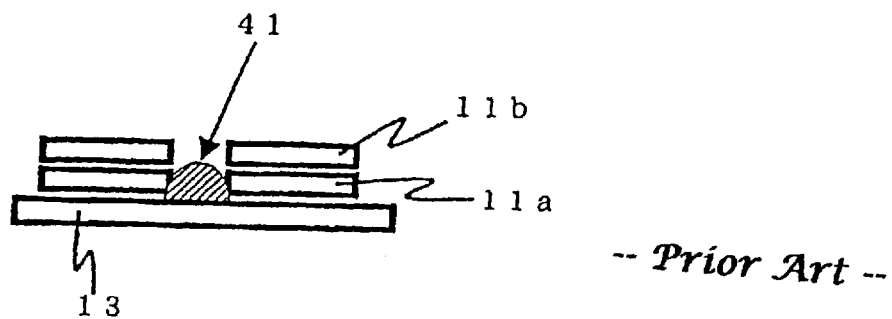

On the other hand, in the conventional laser welding of capacitor elements using no weld metal shown in FIG. 4, the melted anode part 41 of the capacitor element flows down as shown in FIG. 5b because of the absence of a material for filling the gaps between the anode lead part and the anode part of the capacitor element, between the anode parts of the capacitor elements, and in the etched part on the surface of the capacitor element. Also, the size of the melted lump is smaller than that in the case of using a weld metal. As a result, satisfactory adhesion may not be obtained between the capacitor elements in the upper portion.

In order to more strongly connect respective capacitor elements with each other, the stacked capacitor elements may be integrated by dipping only the cathode parts of respective capacitor elements in an electrically conducting material bath such as silver paste, and drying to thereby harden the electrically conducting material. Examples of the electrically conducting material include known electrically conducting pastes such as silver paste, and fusible metals such as cream solder.

The solid electrolytic capacitor device connected to the lead frame as such is molded with an outer jacket resin such as epoxy resin by means of a transfer molding machine or the like and then, the protruding part of the lead frame is cut in the vicinity of the capacitor device to provide a chip-form solid electrolytic capacitor.

The material for the lead frame may be a material commonly employed for this purpose, but a copper-based (for example, Cu—Ni, Cu—Ag, Cu—Sn, Cu—Fe, Cu—Ni—Ag, Cu—Ni—Sn, Cu—Co—P, Cu—Zn—Mg or Cu—Sn—Ni—P alloy) material or a material having a surface plated with a copper-based material is preferably used. When the lead frame is constituted by such a material and the shape of the lead frame is designed, effects such as a decrease in resistance and enhancement of workability in chamfering the lead frame are obtained. Furthermore, a semi-gloss or mat material where the laser reflectance on the surface abutting the anode part of the capacitor element is appropriately adjusted, can be suitably used.

EXAMPLES

The present invention is described in greater detail below in the following representative Examples. However, the present invention should not be construed as being limited thereto.

Example 1

768 Sheets of electrochemically formed aluminum foil (foil species: 110LJB22B, produced by Japan Capacitor Industrial Co., Ltd., rated withstanding voltage: 4 vf) in a size of 11 mm×3.3 mm (hereinafter referred to as "electrochemically formed foil") were prepared. A masking in a width of 1 mm was circumferentially formed including both surfaces and both edges of the electrochemically formed foil using a masking material (heat-resistant resin) to divide the foil into two parts from the distal end, namely, the cathode part (3.3 mm (width)×4 mm (length)) and the anode part. The cathode part of this electrochemically formed foil, which was the divided portion in the distal end side, was electrochemically formed using an aqueous 10 wt % ammonium adipate solution as the electrolytic solution at a temperature of 55° C., a voltage of 4 V, a current density of 5 mA/cm$^2$ and a current passing time of 10 minutes, and then washed with water.

Thereafter, the cathode part was dipped in 1 mol/liter of an isopropyl alcohol solution of 3,4-ethylenedioxythiophene, left standing for 2 minutes, dipped in a mixed aqueous solution of an oxidizing agent (1.5 mol/liter of ammonium persulfate) and a dopant (0.15 mol/liter of sodium naphthalene-2-sulfonate), and then left standing at 45° C. for 5 minutes, thereby allowing oxidative polymerization to proceed.

This operation including the impregnation step and the polymerization step was repeated 12 times to form a dopant-containing solid electrolyte layer in micropores of the electrochemically formed foil. The electrochemically formed foil having formed thereon a dopant-containing solid electrolyte layer was washed in warm water at 50° C. to form a solid electrolyte layer.

After the solid electrolyte layer was formed, the foil was again electrochemically formed using an aqueous 10 wt % ammonium adipate solution as the electrolytic solution at a temperature of 55° C., a voltage of 4 V, a current density of 5 mA/cm$^2$ and a current passing time of 10 minutes, then washed with water and dried at 100° C. for 30 minutes. Thereon, a carbon paste and a silver paste were sequentially coated to form an electrically conducting cathode layer.

Thereafter, the unnecessary anode part of the electrochemically formed foil was cut to obtain a capacitor element. Three sheets of this capacitor element were stacked on the cathode and anode lead parts using a silver paste as the electrically conducting adhesive. An Ni strip having a size of 1 mm×3 mm and a thickness of 0.1 mm was placed onto the anode part of capacitor element furthest from the anode lead part. The anode parts of the respective capacitor elements and anode lead part were then joined by laser welding by irradiating with a YAG laser ray, the molten Ni strip forming an uppermost layer of the common anode of the stacked capacitor elements.

The spot diameter of the YAG laser ray was φ=0.4 mm and the output waveform was a two-stage waveform consisting of irradiation at 4.5 kJ/s for 2 msec and then irradiation at 1.5 kJ/s for 8 msec.

The thus-obtained capacitor device having a multilayer structure was molded with an epoxy resin and thereto, a voltage of 2.5 V was applied for 45 minutes in an environment of 135° C. In this manner, 256 units of a solid electrolytic capacitor having a structure where three capacitor elements were stacked, and having a rated capacitance of 100 μF and a rated voltage of 2 V were obtained.

The capacitance of the 256 units of the solid electrolytic capacitor were measured and the results are shown in Table 1.

TABLE 1

Capacitance Distribution

| Capacitance | Number of Capacitor Units |
|---|---|
| less than 70 μF | 1 |
| 70 to less than 90 μF | 1 |
| 90 to less than 92 μF | 0 |
| 92 to less than 94 μF | 0 |
| 94 to less than 96 μF | 0 |
| 96 to less than 98 μF | 30 |
| 98 to less than 100 μF | 27 |
| 100 to less than 102 μF | 107 |
| 102 to less than 104 μF | 46 |
| 104 to less than 106 μF | 38 |
| 106 to less than 108 μF | 5 |
| 108 to less than 110 μF | 0 |
| 110 to less than 130 μF | 0 |
| 130 μF or more | 1 |

Example 2

256 Units of a capacitor device were manufactured in the same manner as in Example 1 except that pyrrole was used in place of 3,4-ethylenedioxythiophene for forming the solid electrolyte layer. At this time, the cathode part was dipped in the pyrrole solution, dried at 3° C. for 5 minutes, dipped in the oxidizing agent solution and then polymerized at 5° C. for 10 minutes. These test samples were evaluated in the same manner as in Example 1. The results are shown in Table 2.

TABLE 2

Capacitor Distribution

| Capacitance | Number of Capacitor Units |
|---|---|
| less than 70 μF | 3 |
| 70 to less than 90 μF | 0 |
| 90 to less than 92 μF | 0 |
| 92 to less than 94 μF | 6 |
| 94 to less than 96 μF | 1 |
| 96 to less than 98 μF | 12 |

TABLE 2-continued

Capacitor Distribution

| Capacitance | Number of Capacitor Units |
|---|---|
| 98 to less than 100 μF | 77 |
| 100 to less than 102 μF | 80 |
| 102 to less than 104 μF | 43 |
| 104 to less than 106 μF | 20 |
| 106 to less than 108 μF | 11 |
| 108 to less than 110 μF | 3 |
| 110 to less than 130 μF | 0 |
| 130 μF or more | 0 |

Example 3

256 Units of a capacitor device were manufactured in the same manner as in Example 1 except that instead of placing an Ni strip having a size of 1 mm×3 mm and a thickness of 0.1 mm on the anode part of the capacitor element furthest from the anode lead part, an Ni strip having the same size and the same thickness was interposed between the anode part of the capacitor element furthest from the anode lead part (uppermost layer) and the anode part of the adjacent capacitor element (lower second layer). The anode parts of the respective capacitor elements and the anode lead part were then joined by laser welding by irradiating with a YAG laser ray. These test samples were evaluated in the same manner as in Example 1. The results are shown in Table 3.

TABLE 3

Capacitor Distribution

| Capacitance | Number of Capacitor Units |
|---|---|
| less than 70 μF | 3 |
| 70 to less than 90 μF | 3 |
| 90 to less than 92 μF | 0 |
| 92 to less than 94 μF | 2 |
| 94 to less than 96 μF | 17 |
| 96 to less than 98 μF | 33 |
| 98 to less than 100 μF | 43 |
| 100 to less than 102 μF | 95 |
| 102 to less than 104 μF | 27 |
| 104 to less than 106 μF | 9 |
| 106 to less than 108 μF | 21 |
| 108 to less than 110 μF | 1 |
| 110 to less than 130 μF | 2 |
| 130 μF less than or more | 0 |

Comparative Example 1

Capacitor elements produced thoroughly in the same manner as in Example 1 were subjected to laser welding without placing an Ni strip on the anode lead part, the resulting multilayer structure was molded with a resin and a voltage of 2.5 V was applied for 45 minutes in an environment of 135° C. In this manner, 256 units of a solid electrolytic capacitor having a structure where three capacitor elements were stacked and having a rated capacitance of 100 μF and a rated voltage of 2 V were obtained. The capacitance of these solid electrolytic capacitors were measured and the results are shown in Table 4.

TABLE 4

| Capacitance | Number of Capacitor Units |
|---|---|
| less than 70 µF | 19 |
| 70 to less than 90 µF | 4 |
| 90 to less than 92 µF | 0 |
| 92 to less than 94 µF | 0 |
| 94 to less than 96 µF | 7 |
| 96 to less than 98 µF | 20 |
| 98 to less than 100 µF | 46 |
| 100 to less than 102 µF | 85 |
| 102 to less than 104 µF | 34 |
| 104 to less than 106 µF | 38 |
| 106 to less than 108 µF | 0 |
| 108 to less than 110 µF | 0 |
| 110 to less than 130 µF | 0 |
| 130 µF or more | 3 |

Capacitor Distribution

When a welding failure is present between capacitor elements or between the capacitor element and the anode lead, the capacitance of the capacitor element subject to welding failure is not reflected in the overall capacitance of the solid electrolytic capacitor. Thus, the overall capacitance of the solid electrolytic capacitor having a welding failure is considerably reduced as compared with the capacitance of a solid electrolytic capacitor having no welding failure.

The number of capacitor units having a capacitance of 70 µF or less in Tables 1 to 3 (invention) where the laser welding is performed using an Ni strip, is considerably lower than in Table 4 (comparison), revealing good connection for the solid electrolytic capacitor of the invention. Presumably, this result is obtained because the joining between the lead frame and the capacitor element and between respective capacitor elements is improved by laser welding with an Ni strip.

Effects of the Invention

When a weld metal is used, the anode part of the capacitor element and the anode lead part are firmly bonded to realize a connection having less electrical resistance, and the capacitance stability, electrical performance and production yield of the solid electrolytic capacitor product is improved.

While the invention has been described in detail and with reference to specific embodiments thereof, it will be apparent to one skilled in the art that various changes and modifications can be made therein without departing from the spirit and scope thereof.

This application is based on Japanese Patent Application No. P2002-057004 filed Mar. 4, 2002, incorporated herein by reference in its entirety.

What is claimed is:

1. A solid electrolytic capacitor comprising a molded body of a solid electrolytic capacitor element having an anode part assigned to one end part of an anode substrate composed of a valve-acting metal having on the surface thereof a dielectric film layer, and a cathode part including a solid electrolyte layer formed on the dielectric film layer in a remaining portion of the anode substrate and having an electrically conducting layer formed thereon, the anode part being connected to a lead frame via a weld metal provided on the anode part of the solid electrolytic capacitor element by irradiating the anode part with a laser ray, said body being molded with an outer jacket resin, and said weld metal being separate from the anode part and the lead frame and having a thickness of from about 50 to 500 µm.

2. The solid electrolytic capacitor as claimed in claim 1, wherein the weld metal is interposed between the anode part of the capacitor element and the lead frame.

3. The solid electrolytic capacitor as claimed in claim 1, wherein the weld metal is capable of being melted by the laser ray.

4. The solid electrolytic capacitor as claimed in claim 1, wherein the laser ray is a ray emitted from a YAG laser, $YVO_4$ laser, carbon dioxide laser or Ar laser.

5. The solid electrolytic capacitor as claimed in claim 1, wherein the weld metal is selected from the group consisting of nickel, iron, copper, aluminum, chromium, molybdenum and alloys thereof.

6. The solid electrolytic capacitor as claimed in claim 1, wherein the valve-acting metal is selected from the group consisting of aluminum, tantalum, titanium, niobium and alloys thereof.

7. The solid electrolytic capacitor as claimed in claim 1, wherein the valve-acting metal comprises an electrochemically formed aluminum foil or an electrochemically formed niobium foil.

8. The solid electrolytic capacitor as claimed in claim 1, wherein the valve-acting metal is a foil electrochemically formed at a voltage of less than 30 V.

9. The solid electrolytic capacitor as claimed in claim 1, wherein the lead frame is a copper- or copper alloy-based material.

10. The solid electrolytic capacitor as claimed in claim 1, wherein the solid electrolyte comprises a π-electron conjugated system polymer.

11. The solid electrolytic capacitor as claimed in claim 10, wherein the π-electron conjugated system polymer is a polymer obtained from a 5-membered heterocyclic compound.

12. The solid electrolytic capacitor as claimed in claim 11, wherein the 5-membered heterocyclic compound comprises at least one compound selected from the group consisting of pyrrole, thiophene, furan, isothianaphthene, 1,3-dihydroisothianaphthene and substitution derivatives thereof.

13. The solid electrolytic capacitor claimed in claim 11, wherein the 5-membered heterocyclic compound comprises at least one compound selected from the group consisting of 3,4-ethylenedioxythiophene and 1,3-dihydroisothianaphthene.

14. The solid electrolytic capacitor as claimed in claim 1, wherein the weld metal is provided on a surface of the anode part opposite the lead frame.

15. A solid electrolytic capacitor comprising a molded body of a plurality of solid electrolytic capacitor elements each having an anode part assigned to one end part of an anode substrate composed of a valve-acting metal having on the surface thereof a dielectric film layer, and a cathode part including a solid electrolyte layer formed on the dielectric film layer in a remaining portion of the anode substrate and having an electrically conducting layer formed thereon, the anode parts and the cathode parts being stacked one on the other, the anode parts being connected to a lead frame via a weld metal provided on one or more of the anode parts of the solid electrolytic capacitor elements by irradiating the anode parts with a laser ray, the stacked body being molded with an outer jacket resin, and said weld metal being separate from the anode part and the lead frame and having a thickness of from about 50 to 500 µm.

16. The solid electrolytic capacitor as claimed in claim 15, wherein the weld metal is interposed between an anode part of a capacitor element and the lead frame and/or between anode parts of the solid electrolytic capacitor elements.

17. The solid electrolytic capacitor as claimed in claim 15, wherein the weld metal is capable of being melted by the laser ray.

18. The solid electrolytic capacitor as claimed in claim 15, wherein the laser ray is a ray emitted from a YAG laser, $YVO_4$ laser, carbon dioxide laser or Ar laser.

19. The solid electrolytic capacitor as claimed in claim 15, wherein the weld metal is selected from the group consisting of nickel, iron, copper, aluminum, chromium, molybdenum and alloys thereof.

20. The solid electrolytic capacitor as claimed in claim 15, wherein the valve-acting metal is selected from the group consisting of aluminum, tantalum, titanium, niobium and alloys thereof.

21. The solid electrolytic capacitor as claimed in claim 15, wherein the valve-acting metal comprises an electrochemically formed aluminum foil or an electrochemically formed niobium foil.

22. The solid electrolytic capacitor as claimed in claim 15, wherein the valve-acting metal is a foil electrochemically formed at a voltage of less than 30 V.

23. The solid electrolytic capacitor as claimed in claim 15, wherein the lead frame is a copper- or copper alloy-based material.

24. The solid electrolytic capacitor as claimed in claim 15, wherein the solid electrolyte comprises a π-electron conjugated system polymer.

25. The solid electrolytic capacitor as claimed in claim 24, wherein the π-electron conjugated system polymer is a polymer obtained from a 5-membered heterocyclic compound.

26. The solid electrolytic capacitor as claimed in claim 25, wherein the 5-membered heterocyclic compound comprises at least one compound selected from the group consisting of pyrrole, thiophene, furan, isothianaphthene, 1,3-dihydroisothianaphthene and substitution derivatives thereof.

27. The solid electrolytic capacitor as claimed in claim 25, wherein the 5-membered heterocyclic compound comprises at least one compound selected from the group consisting of 3,4-ethylenedioxythiophene and 1,3-dihydroisothianaphthene.

28. A method for producing a solid electrolytic capacitor, said solid electrolytic capacitor comprising a molded body of a solid electrolytic capacitor element having an anode part assigned to one end part of an anode substrate composed of a valve-acting metal having on the surface thereof a dielectric film layer, and a cathode part including a solid electrolyte layer formed on the dielectric film layer in a remaining portion of the anode substrate and having an electrically conducting layer formed thereon, the anode part being connected to a lead frame via a weld metal provided on the anode part of the solid electrolytic capacitor element by irradiating the anode part with a laser ray, said body being molded with an outer jacket resin, and said weld metal being separate from the anode part and the lead frame and having a thickness of from about 50 to about 500 μm, which method comprises providing an anode part at one end part of an anode substrate composed of a valve-acting metal having on the surface thereof a dielectric film layer, forming a solid electrolyte layer on the dielectric film layer in a remaining portion of the anode substrate and an electrically conducting layer thereon to provide a cathode part, thereby preparing a solid electrolytic capacitor element, providing a weld metal on the anode part, irradiating the anode part with a laser ray to connect it to a lead frame, and molding with an outer jacket resin.

29. The method for producing a solid electrolytic capacitor as claimed in claim 28, which comprises stacking a plurality of solid electrolytic capacitor elements to superpose the anode parts and the cathode parts one on the other, providing a weld metal on one or more of the anode parts, irradiating the anode parts with a laser ray to connect them to a lead frame, and molding the stacked body with an outer jacket resin.

30. The method for producing a solid electrolytic capacitor as claimed in claim 28, wherein the laser ray is a ray emitted from a YAG laser, $YVO_4$ laser, carbon dioxide laser or Ar laser.

* * * * *